Jan. 2, 1962   J. F. ANGIER   3,015,717
RUNWAY LIGHT

Filed May 21, 1959   2 Sheets-Sheet 1

INVENTOR.
James F Angier
BY Wenderoth, Lind & Ponack
ATTORNEYS

Jan. 2, 1962 J. F. ANGIER 3,015,717
RUNWAY LIGHT
Filed May 21, 1959 2 Sheets-Sheet 2

INVENTOR.
James F Angier
BY Wenderoth, Lind & Ponack
ATTORNEYS

United States Patent Office 3,015,717
Patented Jan. 2, 1962

3,015,717
RUNWAY LIGHT
James F. Angier, Takoma Park, Md., assignor to Structural Electric Products Corp., a corporation of Delaware
Filed May 21, 1959, Ser. No. 814,741
5 Claims. (Cl. 240—1.2)

The present invention relates to a light which can easily and quickly be set into the surface of a runway, taxiway or other similar vehicle bearing paved surface.

Heretofore, lights for runways and the like have been of a size and complexity such that their installation on a runway which was already completed, required the closing down of a runway during the time the lights were being installed. This has been because excavations for the lighting device itself and for the power leads for supplying power to the individual lights necessitated considerable excavation. This situation has occurred most noticeably in the case of lights which have been placed in the runway or taxiway paving at or near the center of the taxiway or runway. The presence of excavations and the equipment necessary to produce them near the center of the paving have rendered the runway or taxiway unusable during the installation operations. At busy airports, the loss of even a single runway is not only inconvenient, but also dangerous, because of the consequent increase in the traffic on other runways necessitated by the shorter intervals between successive take-offs and successive landings. The closing down of a taxiway is inconvenient in that it requires aircraft to use alternate taxiways which results in greater taxiing distances and times, and it is dangerous in that it slows down clearance of the runway by aircraft already landed thus forcing aircraft waiting to land to circle the airport in the congested air space until the runway is cleared. In addition there is considerable inconvenience to travelers due to the delays in the landings and take-offs which almost invariably result.

There is thus a need for a light which can be installed on a runway or taxiway without disrupting the use of the runway or taxiway and yet which is powerful enough to be useful in airport lighting and which does not hinder the normal care and maintenance of the pavement, such as snow plowing, cleaning, etc., and which will at the same time not give an unduly heavy shock to an airplane wheel passing over it.

It is a still further object of the present invention to provide a light which has a low profile and yet which permits normal care and maintenance of the runway or other paved surface, such as plowing, cleaning and like operations by the use of wheeled vehicles without the danger of the light being damaged by the plows and other maintenance implements on the maintenance vehicles or the wheels of the maintenance vehicle becoming jammed in the light.

Other and further objects of the invention will become apparent from the following specification and the appended claims taken together with the accompanying drawings in which FIG. 1 is a plan view of a light according to the present invention;

Figure 1:
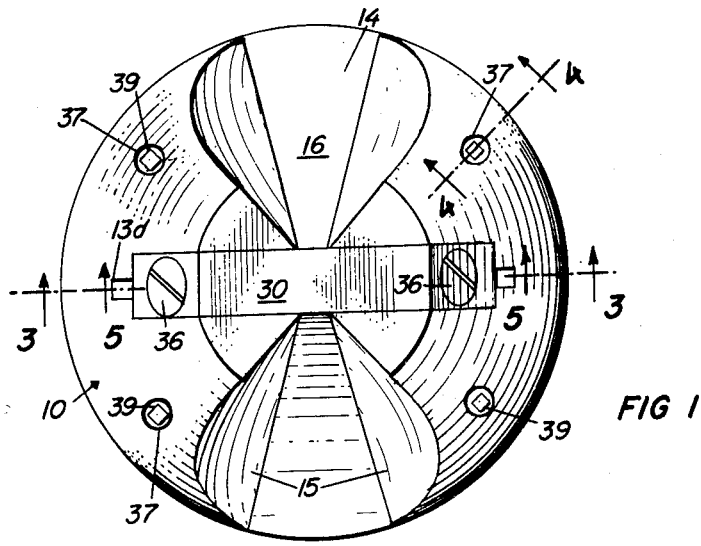
Figure 3:
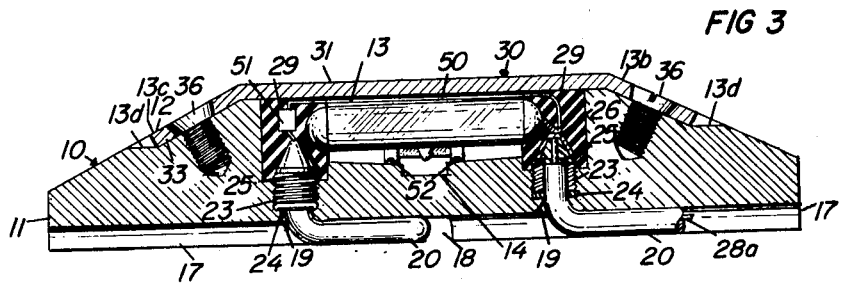
FIG. 3 is a section along line III—III of FIG. 1.
Figure 2:
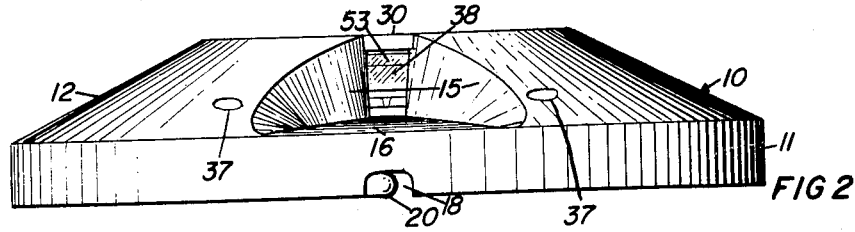
FIG. 2 is a side elevation view of the light of FIG. 1.
Figure 4:
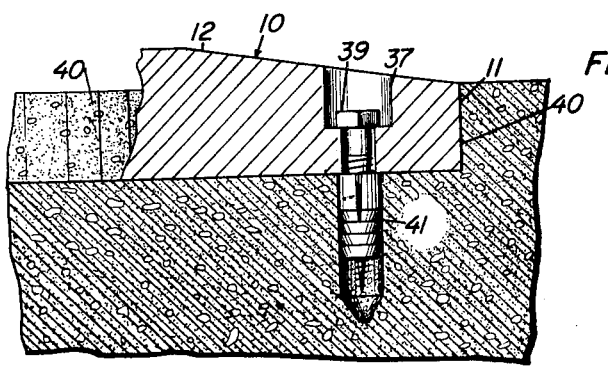
FIG. 4 is a partial sectional view along line IV—IV of FIG. 1.

As seen in the figures the light according to the invention comprises a base 10 having a right cylindrical bottom 11 and a domed top 12 thereon. In the domed top 12 is an elongated recess 13, shown in the present embodiment as being substantially rectangular in shape. The bottom the elongated recess is tapered inwardly toward the longitudinal center line thereof and is also tapered downwardly toward the middle of the recess in the direction of its elongation. The domed top 12 also has a slot 14 therein extending in a direction substantially perpendicular to the elongated recess 13 through the center of the elongated recess. The slot 14 has side walls 15 which diverge outwardly from the center of the domed top toward the edge of the base 10.

A ledge 13a is provided around the top of the elongated recess 13, and further recesses 13b and 13c are provided which extend downwardly along the tapered portion of the domed top 12. A light cover 30 is provided which has a substantially rectangular top portion 31 which fits over the elongated recess 13 and the edges of which rest on the ledge 13a. The light cover 30 has angled ends 33 thereon, which angled ends fit into the recesses extending down over the domed top, where they are secured by screws 36. Grooves 13d are provided at the ends of recesses 13c and 13d to permit insertion of a screwdriver or the like under the ends of cover 30.

Grooves are provided in the bottom surface of the right cylindrical bottom, groove 17 being parallel to the elongated recess 13, and the groove 18 being substantially perpendicular thereto.

The base 10 is shown as having counter sunk holes 37 therethrough for bolts 39 for securing the base to the pavement on which the light is to be installed. Alternatively holes 37 may be omitted, in which case the base is secured to the pavement by a suitable adhesive.

Figures 5, 6:
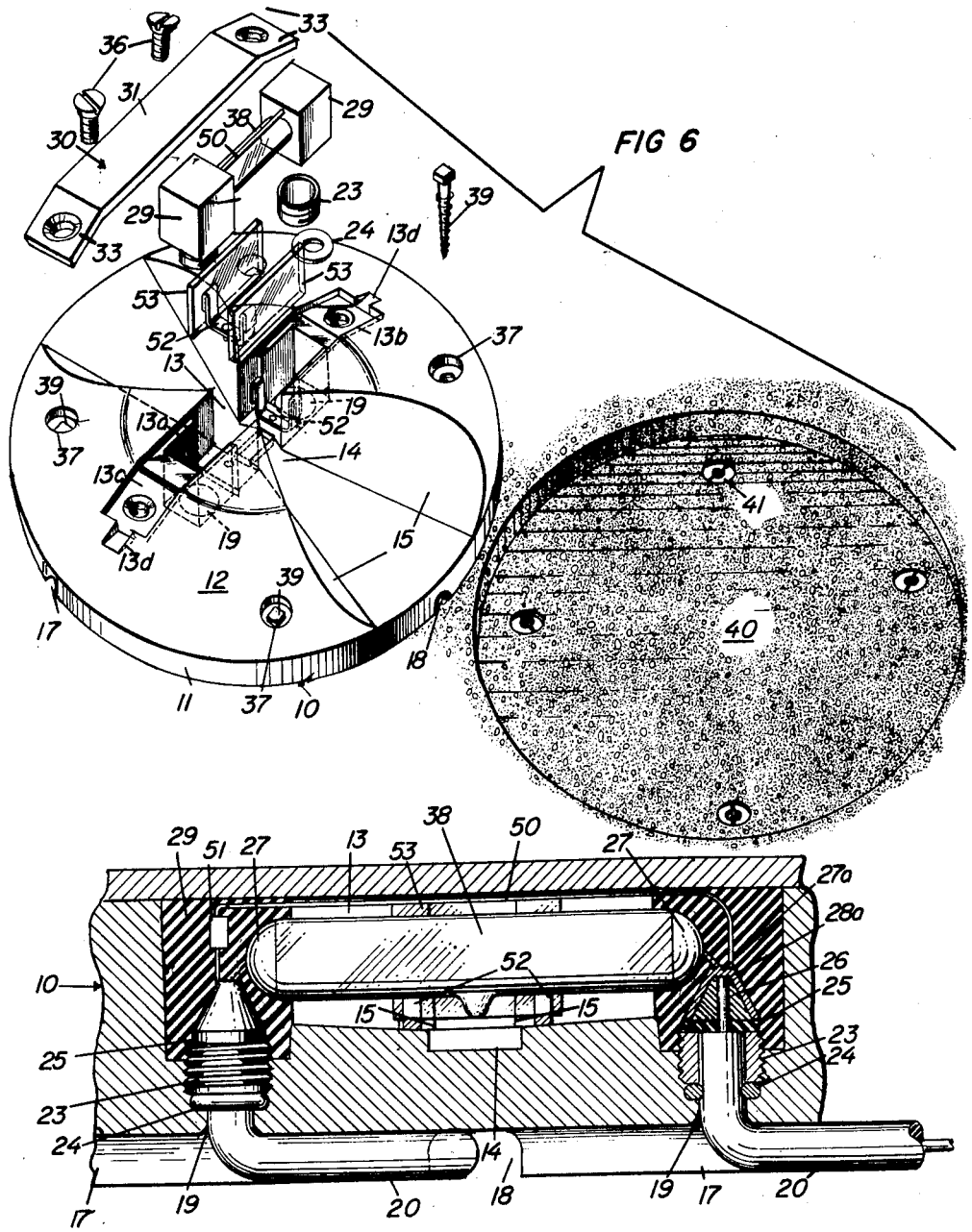
FIG. 5 is an enlarged detail view along line V—V of FIG. 1.
FIG. 6 is an exploded perspective view of the light of FIG. 1.

Base 10 has further holes 19 therethrough between the ends of the elongated recess 13 and the groove 17 (see FIG. 5). In the illustrated embodiment power leads 20 extend through the holes. Light mounting means are provided in the elongated recess 13 which comprise a bushing 23 threaded into the base 10 at either end of the elongated recess with a sealing ring 24 between the bushing 23 and the bottom of the tapped hole therefor. An insulating washer 25 is positioned on top of the bushing, and a terminal is provided which is comprised by a projection 26 mounted over the insulating washer 25. The projection is here shown as a conical projection, to which the conductor 28a of the power lead is attached. Other connections are of course possible. For example, the projections 26 could extend through the holes 19 in the base 10 and the power leads could be attached to the terminals beneath the base.

A lighting assembly is provided which comprises an elongated light source, preferably an elongated quartz lamp 38 having a low elevation profile which is now available on the market, the ends of which form the contacts for the lighting filaments within the lamp. Spring clip means 27 are provided at either end of the lamp to which spring clip means the ends of the lamp are electrically connected which spring clip means have terminal engaging means, here shown in the form of a cup-shaped member 27a having a shape complementary to the projections 26. The spring clips and the ends of the lamps are sealed in a waterproof sealing compound 29.

Lights of this type, being low voltage lamps, are usually connected in series. In order that the whole string of lights is not extinguished when one lamp is burned out, a cut-out arrangement may be provided. This consists of a shorting wire 50 connected in parallel with the lamp 38 across spring clip means, there being a film disc cutout 51 between one end of the wire 50 and one of the spring clip means 27. When the elements of the lamp 38 burn out, the full voltage across the terminals 26 is applied through the film disc cutout 51. This shorts out the film disc cutout and the burned out lamp is thus bypassed by the current flowing in the lighting circuit.

Further, there may be provided in the elongated recess 13 U-shaped clips 52 which are fastened to the bottom of the recess 13. Between the legs of these clips and the side walls of the recess may be placed filters 53 of colored glass or the like so that the light coming from the lamp 38 may be made an appropriate color.

The lighting unit made up of the elongated lamp 38, spring clip means, the cutout arrangement and sealing compound 29 is removable from the light as a unit, so that in the event the lamp 38 burns out, the entire lighting unit can be removed and replaced by a new lighting unit merely by lifting on the lamp to disengage the spring clip means 27 from the projections 26. In this way a substitution of a new lamp can be made in a matter of moments. The lighting unit may be attached to or be separate from the cover 30. In the former construction the cover is also replaced along with the lighting unit.

The installation of the light is carried out by first making a shallow hole 40 in the surface, for example of a runway, into which the light is to be set, which hole is the size of the right cylindrical base 11. If the light is to be bolted in place, a plurality of expansion anchors 41 corresponding to the number of countersunk holes 37 in the base 10 are sunk into the bottom of the hole. If the light is to be secured by adhesive, no anchors need be used. A narrow trench (not shown) is then made in the pavement, preferably by means of a masonry saw or the like, which trench enters the shallow hole. The power 20 leads are then placed in the trench and connected to the terminal assembly in the light, and the right cylindrical bottom 11 is set into the shallow hole 40 therefor and is bolted in position by bolts 39 or secured in position by the use of a suitable adhesive. The lighting unit is then installed and the light cover 30 placed over it and secured by the screws 36. When the cover 30 is tightened down, the sealing compound 29 and spring clip means 27 are compressed around the projections 26, thus sealing them against moisture.

All of these installation operations are extremely simply and consume very little time with the power tools now available. They can be performed on a runway between takeoffs and landings without disrupting these operations in the slightest. The excavations in the runway are not such as will make it necessary to take the runway out of service, and indeed it is possible for aircraft wheels to run over such excavations without damage to the aircraft.

The low profile of the runway light enables aircraft to run over it at relatively high speed without damage to the aircraft or to the fixture, yet the light emitted by the fixture is sufficiently great to be useful, particularly for runway marker lights.

The low profile of the light also serves to permit normal maintenance operations without damage either to the light or to the maintenance vehicles used in the maintenance. Snowplow blades moving along the pavement in a direction parallel to the slot 14 will ride over the light, and plow blades moving along the pavement in a direction perpendicular to the slot 14, if the end thereof engages in the end of the slot 14 will be raised upon engagement with the outwardly and upwardly canted walls 15.

Wheeled vehicles moving along the pavement in a direction perpendicular to the slot 14 will ride over the base 10 with no difficulty, while wheeled vehicles moving along the pavement in a parallel to the slot 14 such that if the wheels engage in the slot they will be squeezed upwardly as the wheels move closer to the center of the base 10 by reason of the canted side walls increasing in their angle to the vertical the closer to the center of the base that the wheel approaches. To a certain degree the light will be self clearing as regards ice and snow. The lamp, which may be of rather high voltage for a lamp of such a low profile, is confined in such a small space that the heat generated thereby heats up the portion of the body 10 in the vicinity of the lamp, this heating being sufficient to melt ice and snow which may became lodged in the center of the light. The melted ice and snow drains freely from the light.

It is thought that the invention and its advantages will be understood from the foregoing description and it is apparent that various changes may be made in the form, construction and arrangement of the parts without departing from the spirit and scope of the invention or sacrificing its material advantages, the form herein before described and illustrated in the drawings being merely a preferred embodiment thereof.

I claim:

1. A light for installation in a surface over which wheeled vehicles run, comprising a base having a top at least slightly domed, said top and base having an elongated recess therein, and having a slot therein extending from said recess substantially perpendicularly thereof at least in one direction from said recess to the peripheral edge of said base, said slot having walls diverging outwardly from said recess to the edge of said base, said sidewalls being canted outwardly and upwardly from the bottom of the recess and at an angle to the vertical which increases continuously toward the peripheral edge of said base, means for mounting an elongated source of light in said elongated recess comprising a terminal member mounted in said base at each end of said elongated recess, said terminal member having a projection thereon extending upwardly therefrom, and an elongated source of light comprising an elongated lamp, terminal engaging means engaging the ends of said lamp and engaging with the projections on said terminals, a sealing compound around the ends of said lamp and said terminal engaging means, and a cover over said elongated recess removably secured to said domed top, said elongated source of light being secured to said cover.

2. A light as claimed in claim 1 in which said terminal engaging means comprises spring clip means having a shape complementary to the shape of the projection on said terminal.

3. A light for installation in a surface over which wheeled vehicles run, comprising a base having a top at least slightly domed, said top and base having an elongated recess therein, and having a slot therein, and having a slot therein extending from said recess substantially perpendicularly thereof at least in one direction from said recess to the peripheral edge of said base, said slot having walls diverging outwardly from said recess to the edge of said base, means for mounting an elongated source of light in said elongated recess comprising a terminal member mounted in said base at each end of said elongated recess, said terminal member having a projection thereon extending upwardly therefrom, and an elongated source of light comprising an elongated lamp, terminal engaging means engaging the ends of said lamp and engaging with the projections on said terminals, a sealing compound around the ends of said lamp and said terminal engaging means, a cutout means electrically connected between said terminal engaging means and in parallel with said lamp for short circuiting said lamp when it burns out, and a cover over said elongated recess removably secured to said domed top, said elongated source of light being secured to said cover.

4. A light as claimed in claim 3 in which said cutout means is a film disc cutout.

5. A light, particularly for installation in a surface over which wheeled vehicles run, comprising a base having a top at least slightly domed, said top and base having an elongated recess therein, and having a slot therein extending from said recess substantially perpendicularly thereof at least in one direction from said recess to the peripheral edge of said base, said slot having walls diverging outwardly from said recess to the edge of said base, a cover over said elongated recess removably secured to said domed top, two bodies of sealing compound suspended from said cover at points spaced from each other and extending downwardly into said elongated recess, an elongated source of light comprising an elongated lamp having the ends thereof mounted in said bodies of sealing compound, a pair of terminals in said elongated recess, each terminal comprising a projecting member and a projection engaging member engaging with the projecting member, said elongated lamp having one member of the two members of each terminal electrically connected to opposite terminals of the lamp and the other member of each terminal being mounted on the base within said elongated recess, the sealing compound around each end of said lamp surrounding the said members of said terminals which are electrically connected to said lamp and supporting said last mentioned terminal members, said sealing compound extending down around the members of said terminals which are mounted on the base in said elongated recess, and cutout means electrically connected between said terminal engaging means and in parallel with said lamp for short circuiting said lamp when it burns out.

References Cited in the file of this patent

UNITED STATES PATENTS

| | | |
|---|---|---|
| 1,473,375 | Kyle | Nov. 6, 1923 |
| 2,316,835 | Blood | Apr. 20, 1943 |
| 2,352,801 | Rolph | July 4, 1944 |
| 2,433,373 | Krim | Dec. 30, 1947 |
| 2,437,522 | Handler | Mar. 9, 1948 |
| 2,602,850 | Cline | July 8, 1952 |
| 2,840,690 | Harling | June 24, 1958 |
| 2,848,597 | Knottnerus | Aug. 19, 1958 |

FOREIGN PATENTS

| | | |
|---|---|---|
| 685,850 | Germany | Dec. 27, 1939 |
| 1,081,471 | France | June 9, 1954 |